US006955455B2

(12) United States Patent  (10) Patent No.: US 6,955,455 B2
Schneider  (45) Date of Patent: Oct. 18, 2005

(54) MAGNETICALLY ATTACHED LIGHTED SIGN

(76) Inventor: Todd T. Schneider, R.R. 3, Box 55C, Great Bend, KS (US) 67530

( * ) Notice: Subject to any disclaimer, the term of this patent is extended or adjusted under 35 U.S.C. 154(b) by 88 days.

(21) Appl. No.: 10/735,325

(22) Filed: Dec. 12, 2003

(65) Prior Publication Data

US 2005/0128757 A1 Jun. 16, 2005

(51) Int. Cl.[7] ............................................. F21V 21/096
(52) U.S. Cl. ...................... 362/398; 362/505; 362/812; 40/600
(58) Field of Search ................................ 362/398, 806, 362/812, 505, 506, 496; 248/206.5; 40/124.04, 40/600, 621, 711

(56) References Cited

U.S. PATENT DOCUMENTS

| | | | |
|---|---|---|---|
| 3,187,449 A * | 6/1965 | Longo et al. ............ 40/661.01 |
| 4,457,089 A | 7/1984 | Phillips, Jr. |
| 4,879,826 A | 11/1989 | Wittke |
| 5,005,306 A * | 4/1991 | Kinstler ..................... 362/486 |
| 5,132,666 A | 7/1992 | Fahs |
| 5,490,046 A * | 2/1996 | Gohl et al. ................... 362/35 |
| 5,559,681 A | 9/1996 | Duarte |
| 5,636,462 A | 6/1997 | Kleiman |
| 5,729,924 A | 3/1998 | Reading |
| 5,905,434 A | 5/1999 | Steffan et al. |
| 6,082,880 A * | 7/2000 | Nerlino et al. .............. 362/493 |
| 6,338,563 B1 | 1/2002 | Norman |
| 6,394,626 B1 | 5/2002 | McColloch |
| 6,520,661 B1 * | 2/2003 | Hill ............................ 362/252 |
| 2003/0221349 A1 * | 12/2003 | Abe ............................ 40/711 |
| 2004/0016160 A1 * | 1/2004 | Hudgins ...................... 40/600 |

* cited by examiner

Primary Examiner—Thomas M. Sember
(74) Attorney, Agent, or Firm—Dale J. Ream

(57) ABSTRACT

A lighted sign for application to a vehicle surface includes first and second metallic layers with a magnetic plate sandwiched therebetween. The second metallic layer includes a circumference smaller than that of the magnetic plate such that it is pressed against a vehicle surface when the magnetic plate is magnetically adhered thereto. A light source is coupled to the magnetic plate with a positive wire connected to the first metallic layer and a negative wire connected to the second layer such that the light source emits light when the first metallic layer is energized by a vehicle electrical power source and is grounded when the second metallic layer is pressed against the vehicle metallic surface. The magnetic plate and first metallic surface include cutouts so that light may be emitted by the light source therethrough. The lighted sign 10 include a microcontroller and environmental sensors for advanced lighting control.

20 Claims, 6 Drawing Sheets

MAGNETICALLY ATTACHED LIGHTED SIGN

BACKGROUND OF THE INVENTION

This invention relates generally to lighted signs and, more particularly, to a lighted sign that may be magnetically attached to a vehicle surface and which utilizes the vehicle for both electrical power and grounding.

Lighted signs for use in advertising, decorative lighting, and even automobile accessories are generally known. Although assumably effective for their intended purposes, the existing devices are not adapted for use with non-conventional vehicles, such as horse trailers and the like, and do not provide efficient electrical grounding using the vehicle surface to which the sign is applied.

Therefore, it is desirable to have a lighted sign that may be removably and magnetically attached to a vehicle surface such as an automobile or trailer. Further, it is desirable to have a lighted sign that may be energized by a vehicle electrical power source and efficiently grounded by the vehicle itself when the sign is attached thereto. Still further, it is desirable to have a vehicle lighted sign which may include a microcontroller and environmental sensors for advanced lighting control.

SUMMARY OF THE INVENTION

A lighted sign for magnetic application to a vehicle surface according to the present invention includes first and second metallic layers with a magnetic plate sandwiched therebetween. The metallic layers may have a foil construction. The second metallic layer includes a circumference smaller than that of the magnetic plate such that it is pressed tightly against a vehicle surface when the magnetic plate is magnetically applied and adhered thereto. A light source, such as a plurality of light emitting diodes, is coupled to the magnetic plate and includes positive wires electrically connected to the first metallic layer and negative wires electrically connected to the second metallic layer. Therefore, a circuit is formed such that the light source may be energized to emit light when the first metallic layer is connected to a vehicle power source. And, the light source is properly grounded when the second metallic layer is pressed against a metal surface of the vehicle. Utilizing the vehicle surface as the grounding layer simplifies construction and allows efficient circuit operation.

For application to non-metallic vehicle surfaces, such as an aluminum trailer or the like, an auxiliary mounting plate may first be affixed to the surface for receiving the magnetic plate of the sign. The lighted sign may also include a translucent layer for diffusing light being emitted by the light source. The layers also include predetermined cut-out portions such that the light is emitted to form a desired alpha-numeric or design indicia. In addition, the first metallic portion may be divided into electrically distinct portions and the light source may be electrically connected to distinct electrical sources for selectively illuminating different aspects of the light source in different situations. Environmental sensors may also be included in cooperation with a microcontroller for advanced lighting control.

Therefore, a general object of this invention is to provide a lighted sign for application to a vehicle surface.

Another object of this invention is to provide a lighted sign, as aforesaid, which may be removably and magnetically attached to a vehicle surface.

Still another object of this invention is to provide a lighted sign, as aforesaid, which utilizes a vehicle power source to energize a light source and utilizes the vehicle surface to which it is attached to ground the light source.

A further object of this invention is to provide a lighted sign, as aforesaid, which includes a microcontroller capable of energizing selected aspects of the light source according to environmental conditions.

A still further object of this invention is to provide a lighted sign, as aforesaid, having sensors capable of sensing environmental conditions such as light, proximity, and acceleration.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

A lighted sign for magnetic attachment to a vehicle surface according to the present invention will now be described in detail with reference to FIGS. 1 through 6 of the accompanying drawings.

Figure 3:
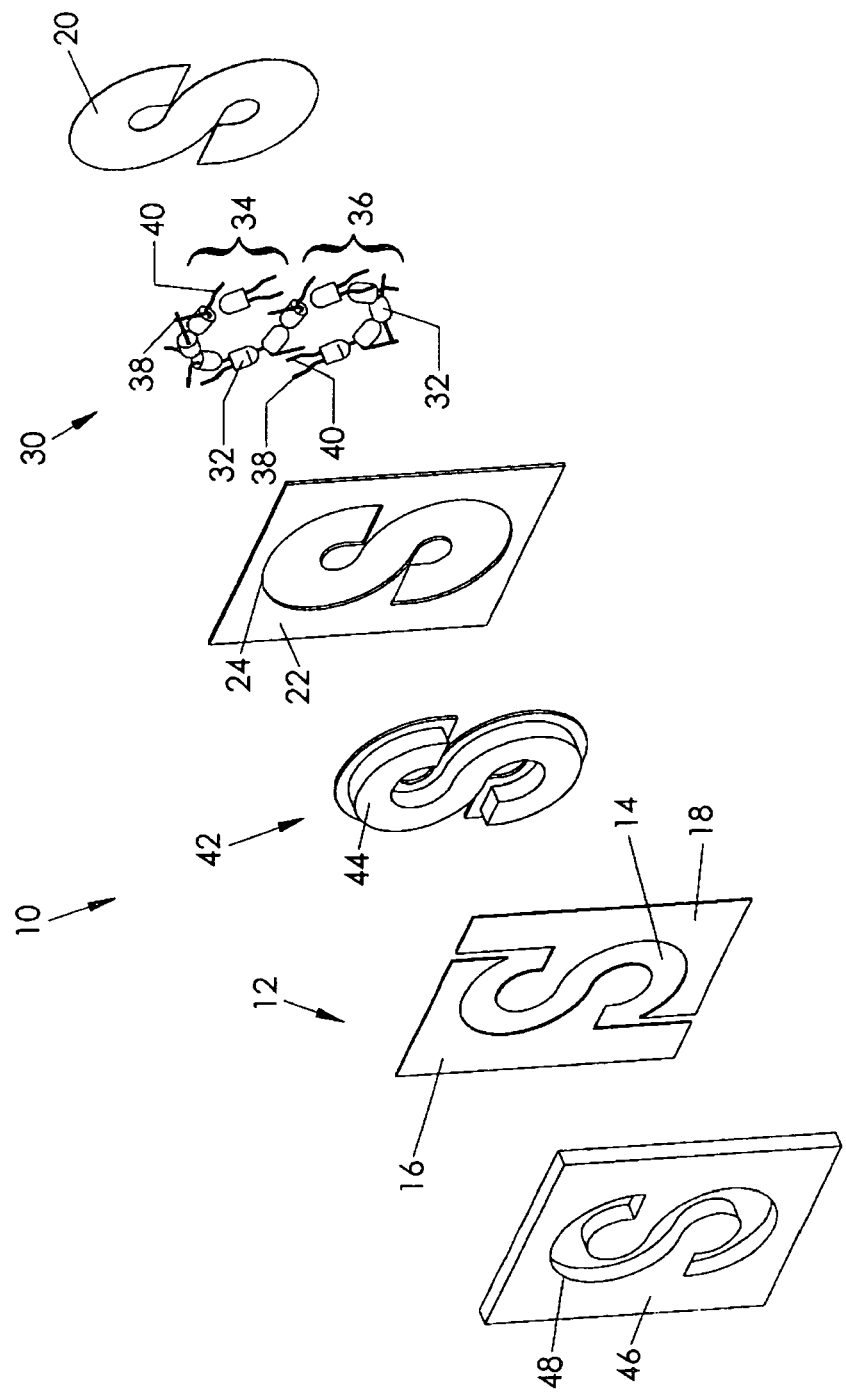
FIG. 3 is an exploded view of the lighted sign as in FIG. 2.

Now more particularly, a lighted sign 10 according to one embodiment of the present invention includes a first metallic layer 12 and a second metallic layer 20 with a magnetic plate 22 sandwiched therebetween. It should be observed and appreciated that the multiple layers of the lighted sign 10 are pressed together in a pressure, friction, adhesive, or other suitable attachment. As shown in FIG. 3, the second metallic layer 20 is immediately adjacent a rear surface of the magnetic plate 22 whereas the first metallic layer 12 is positioned adjacent a front surface of the magnetic plate 22. At least the rear surface of the magnetic plate 22 is capable of being magnetically adhered to a metallic vehicle surface, such as a bumper, door, tailgate, or the like. As the circumference and surface area of the magnetic plate is larger than the circumference and surface area of the second metallic layer 20, the second metallic layer 20 is sandwiched and pressured against a vehicle surface when the magnetic plate 22 is magnetically adhered thereto. This is important as the second metallic layer 20 acts to ground a light source through the vehicle surface, as will be further described later.

The magnetic plate 22 and first metallic layer 12 define cutouts 24, 14, respectively, having corresponding and substantially similar configurations. These cutouts 24, 14 may be in the form of alpha-numeric characters or other designs. The second metallic layer 20 does not include a cutout but includes a configuration corresponding to the cutouts 24, 14 of the magnetic plate 22 and first metallic layer 12. The significance of these configurations will be described in more detail below.

A light source 30 is coupled to the magnetic plate 22 (FIG. 3). Preferably, this light source 30 includes a plurality of light emitting diodes (LED's) 32, each LED including a positive wire 38 and a negative wire 40. Thus, there is a plurality of positive and negative LED wires. Preferably, the LED's 32 are situated within the magnetic plate cutout 24 such that the positive wires 38 may be directed forwardly to contact the first metallic layer 12 and the negative wires may be directed rearwardly to contact the second metallic layer 20. Therefore, the LED's 32 may emit light when the first metallic layer 12 is energized by its electrical connection to a vehicle power source and the second metallic layer 20 is attached to a metallic vehicle surface. The first 12 and second 20 metallic layers may include a foil construction although other constructions capable of conducting electricity would also work.

The first metallic layer 12 may include a first portion 16 electrically separated from a second portion 18 (FIG. 3). Accordingly, a first group 34 of LED's may be electrically connected to the first portion 16 while a second group 36 of LED's may be electrically connected to the second portion 18. The two portions may be connected to different vehicle power sources such that the different groups of LED's may be selectively energized and illuminated according to different conditions. Shown as a circuit diagram in FIG. 5, the first group 34 of LED's are in electrical connection with the vehicle tail lights 50 while the second group 36 of LED's are in electrical connection with the vehicle brake lights 52. Thus, the first group 34 is energized whenever the vehicle's tail lights 50 are on while the second group 36 is only illuminated when the brake lights 52 are engaged.

The lighted sign 10 further includes a translucent layer 42 sandwiched between the magnetic plate 22 and first metallic layer 12 (FIG. 3) although it could also be situated forwardly of the first metallic layer 12. Preferably, the translucent layer 42 includes a raised portion 44 having a configuration corresponding to that of the cutout 14 of the first metallic layer 12 for extension therethrough. The translucent layer 42 causes light emitted from the light source 30 to be diffused so as not to be a traffic hazard to other motorists.

Figure 1:
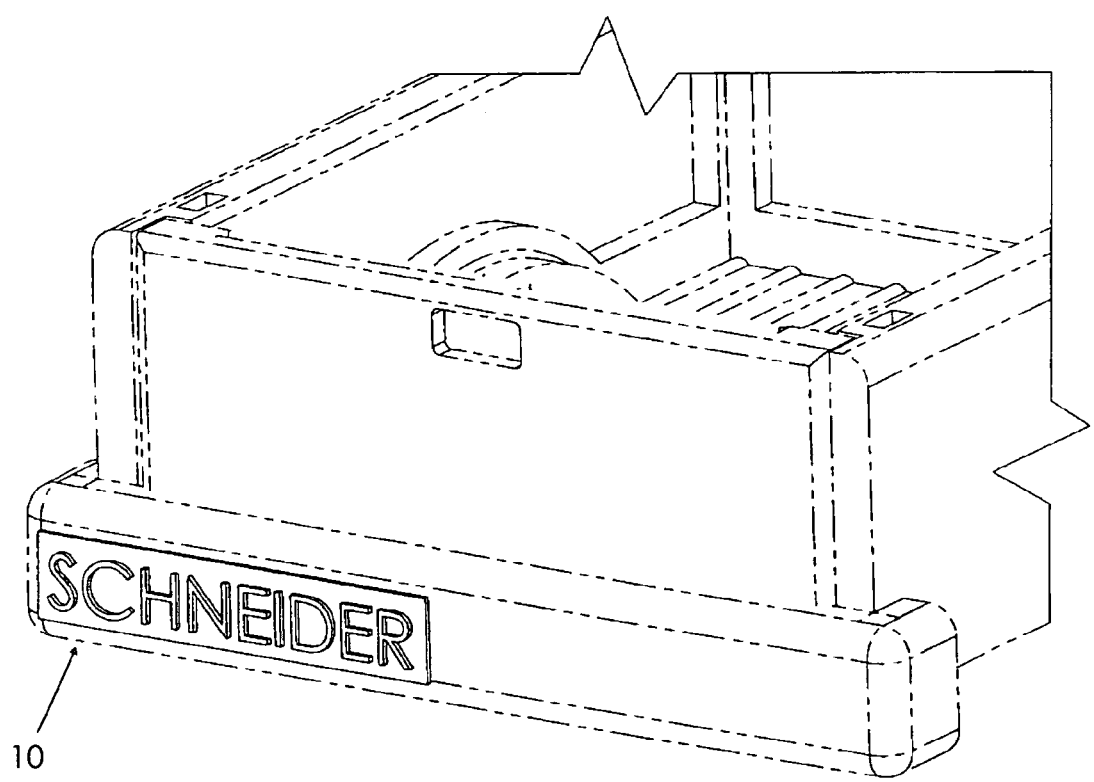
FIG. 1 is a perspective view of a lighted sign according to an embodiment of the present invention shown applied to a metallic vehicle surface.
Figure 2:
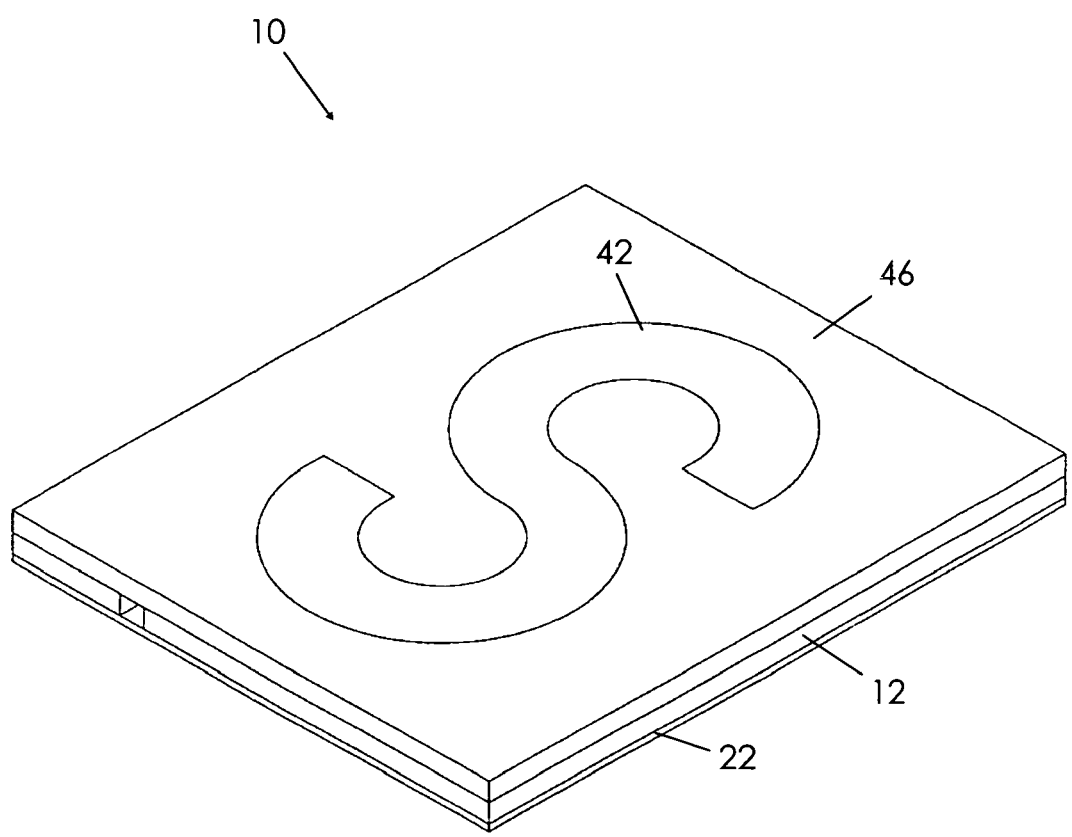
FIG. 2 is a perspective view of a scaled-down form of the lighted sign as in FIG. 1 removed from a vehicle.

The lighted sign 10 further includes a front cover 46 having an attractive appearance and preferably made of a light-weight but durable plastic material such as a thermoplastic or olefin material (FIGS. 2 and 3). Other durable plastics may also be used, such as ABS, polypropylene, polycarbonate, or polyethylene plastics which exhibit various degrees of weatherability and durability. The overall configuration of the cover 46 is substantially similar to that of the first metallic layer 12 and magnetic plate 22. The cover 46 further defines a cutout 48 substantially similar to the cutouts of the first metallic layer 12 and magnetic plate 22 such that light may be transmitted therethrough. Again, the layers described herein may be attached together with an adhesive or other suitable means. The overall appearance is specifically not limited to the square or rectangular forms shown in the drawings.

In use, the lighted sign 10 may be removably positioned and mounted to a vehicle such as a truck, car, horse trailer or the like. More particularly, the magnetic plate 22 of the lighted sign 10 may be magnetically adhered to a metallic surface of the vehicle, said mounting causing the second metallic layer (i.e. the grounding layer) to be pressed against the vehicle surface. The first metallic layer 12 may then be electrically connected to one or more vehicle power sources, such as a battery, tail lights, or brake lights. The light source 30 of the lighted sign 10 may then be selectively energized to emit light through the translucent layer 42 to be seen through the corresponding cutouts. The light source 30 is properly grounded in that positive wires 38 thereof are connected to the first metallic layer 12 and negative wires 40 thereof are connected to the second metallic layer (grounding layer) which is in contact with a vehicle metallic surface.

Figure 4:
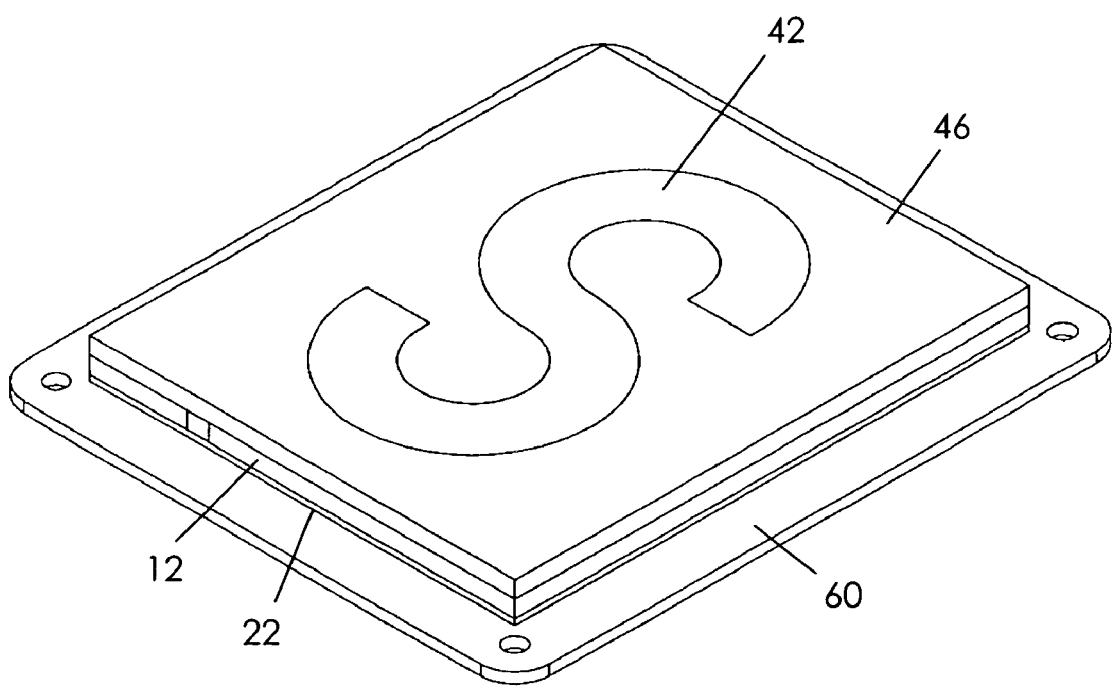
FIG. 4 is a lighted sign according to another embodiment of the present invention.
Figure 5:
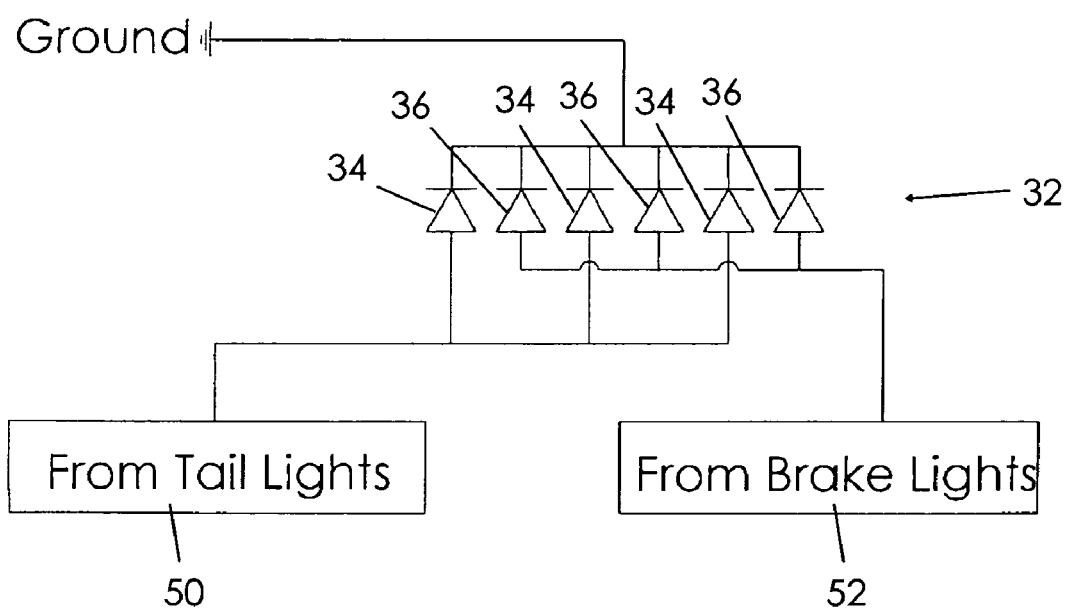
FIG. 5 is a circuit diagram of the lighted sign as in FIG. 2 illustrating the electrical connections of a light source to two vehicle electrical power sources.

Alternatively, the lighted sign 10 may also include a mounting plate 60 having a metal construction (FIG. 4). The mounting plate 60 may be attached to a vehicle surface with screws, other fasteners, or even adhesively. This is advantageous when the vehicle surface is not a metallic surface to which the lighted sign 10 may be magnetically adhered. With the mounting plate 60 installed, the lighted sign 10 may be removably and magnetically adhered thereto as previously described.

Figure 6:
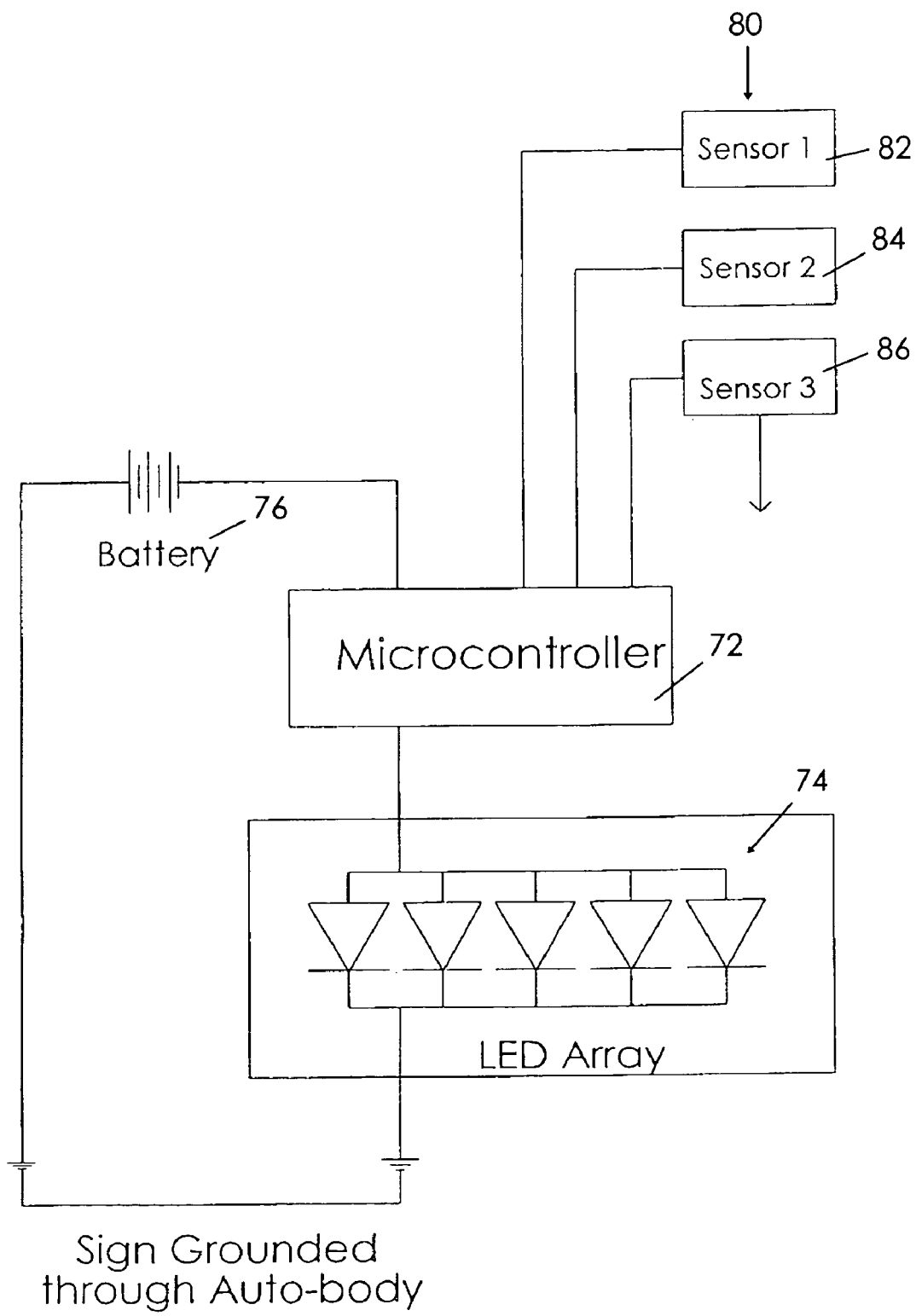
FIG. 6 is another circuit diagram illustrating the electrical connections utilized in another embodiment of the present invention.

Another alternative embodiment is illustrated in the circuit diagram shown in FIG. 6. In this embodiment of a lighted sign 70, a microcontroller 72 is incorporated into the electrical connections between the LED's 74 and vehicle battery 76 or other electrical power sources. More particularly, the microcontroller 72 is directly connected to the positive wires of the LED's and includes predetermined logic functions for energizing specific LED's. It should also be appreciated that the microcontroller 72 may be connected to the first 16 and second 18 portions of the first metallic layer 12 as previously described for energizing predetermined groups of LED's. The lighted sign 72 according to this embodiment further includes a plurality of sensors 82, 84, 86 for providing environmental condition data to the microcontroller 72. The microcontroller 72 is programmed to energize particular LED's or groups thereof according to the sensed data.

The sensors may include a light sensor 82 such that the microprocessor 72 will energize appropriate LED's 74 upon sensing a predetermined light level. An acceleration sensor 84 may also be provided such that the microprocessor 72 will energize or even flash appropriate LED's 74 when an acceleration or deceleration of the vehicle is sensed. A proximity sensor 86 may also be included such that the microprocessor 72 may energize appropriate LED's upon sensing that a following vehicle is too close to the vehicle. It is understood that controlling the LED's 74 depending on the state of the brake lights and taillights can also be handled by the microcontroller as an alternative to the direct electrical connections described previously.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A lighted sign for application to a surface of a vehicle, said lighted sign comprising:
   a first metallic layer;
   a second metallic layer;
   a magnetic plate for removable magnetic adherence to the vehicle surface, said magnetic plate being sandwiched between said first and second metallic layers for pressing said second metallic layer against the vehicle surface when said magnetic plate is magnetically adhered thereto; and a light source coupled to said magnetic plate and having a positive wire electrically connected to said first metallic layer and a negative wire electrically connected to said second metallic layer, said positive wire being electrically connected to a vehicle electric power source.

2. The lighted sign as in claim 1 wherein said magnetic plate and said first metallic layer define correspondingly shaped cutouts such that said light source emits light therethrough when energized.

3. The lighted sign as in claim 2 further comprising a translucent layer sandwiched between said magnetic plate and said first metallic layer for diffusing light emitted from said light source.

4. The lighted sign as in claim 3 wherein said translucent layer includes a raised portion extending through said cutout of said first metallic layer.

5. The lighted sign as in claim 2 wherein:
said second metallic layer includes a configuration corresponding to a configuration of respective cutouts of said magnetic plate and said first metallic layer; and
said light source includes a plurality of light emitting diodes (LED's) arranged according to said configuration of said second metallic layer, each LED having an LED negative wire in electrical contact with said second metallic layer.

6. The lighted sign as in claim 5 wherein:
each LED includes an LED positive wire; and
said first metallic layer includes a first portion and a second portion electrically separated from said first portion, said first portion being electrically connected to a first predetermined group of said LED's and said second portion being electrically connected to a second predetermined group of said LED's for selectively energizing said first and second groups.

7. The lighted sign as in claim 1 wherein said light source includes a plurality of light emitting diodes (LED's).

8. The lighted sign as in claim 1 further comprising a mounting plate configured for fixed attachment to the vehicle surface, whereby said magnetic plate may be removably and magnetically adhered to said mounting plate with said second metallic layer being pressed against said mounting plate when said magnetic layer is adhered thereto.

9. The lighted sign as in claim 1 further comprising:
a microcontroller electrically connected to said light source;
sensor means for communicating environmental conditions to said microcontroller; and
means in said microcontroller for selectively energizing said light source according to respective environmental conditions.

10. The lighted sign as in claim 1 wherein said first and second metallic layers include a foil construction.

11. A lighted sign for magnetic application to a metallic surface of a vehicle, comprising:
a magnetic plate for magnetic attachment to the vehicle surface, said magnetic plate defining a magnetic plate cutout;
a first metallic layer connected to a front surface of said magnetic plate and defining a first layer cutout corresponding to said magnetic plate cutout, said first metallic layer being electrically connected a vehicle electrical power source;
a second metallic layer connected to a rear surface of said magnetic plate, said second metallic layer having a circumference smaller than a circumference of said magnetic plate such that said second metallic layer is sandwiched between said magnetic plate and the vehicle surface when said magnetic layer is magnetically attached to the vehicle surface; and
a plurality of LED's coupled to said magnetic plate, each LED having a positive and negative wire, each positive wire being electrically connected to said first metallic layer and each negative wire being electrically connected to said second metallic layer such that said plurality of LED's are illuminated and grounded when said positive layer is energized and said magnetic plate is magnetically attached to the vehicle surface.

12. The lighted sign as in claim 11 wherein said first metallic layer includes a first portion and a second portion electrically separated from said first portion, said first portion being electrically connected to a first group of said LED's and said second portion being electrically connected to a second group of said LED's for selectively energizing said first and second groups.

13. The lighted sign as in claim 12 further comprising:
a microcontroller electrically connected to said light source;
sensor means for communicating environmental conditions to said microcontroller;
means in said microcontroller for selectively energizing said plurality of LED's according to respective environmental conditions; and
means in said microcontroller for selectively energizing said first and second portions of said magnetic plate.

14. The lighted sign as in claim 12 wherein said first group of said LED's positive wires are electrically connected to a first vehicle electrical power source and said second group of LED's are electrically connected to a second vehicle electrical power source.

15. The lighted sign as in claim 11 wherein said first metallic layer includes a first metallic layer cutout having a configuration substantially similar to a configuration of said magnetic plate cutout such that said plurality of LED's emit light therethrough when energized.

16. The lighted sign as in claim 15 further comprising a translucent layer sandwiched between said magnetic plate and said first metallic layer for diffusing light emitted from said plurality of LED's.

17. The lighted sign as in claim 16 wherein said translucent layer includes a raised portion extending through said cutout of said first metallic layer.

18. The lighted sign as in claim 11 further comprising a mounting plate configured for fixed attachment to the vehicle surface, whereby said magnetic plate may be removably and magnetically adhered to said mounting plate with said second metallic layer being pressed against said mounting plate when said magnetic layer is adhered thereto.

19. The lighted sign as in claim 11 further comprising:
a microcontroller electrically connected to said light source;
sensor means for communicating environmental conditions to said microcontroller; and
means in said microcontroller for selectively energizing said plurality of LED's according to respective environmental conditions.

20. The lighted sign as in claim 19 wherein said environmental sensors are a light sensor, acceleration sensor, and a proximity sensor.

* * * * *